Figure 1:
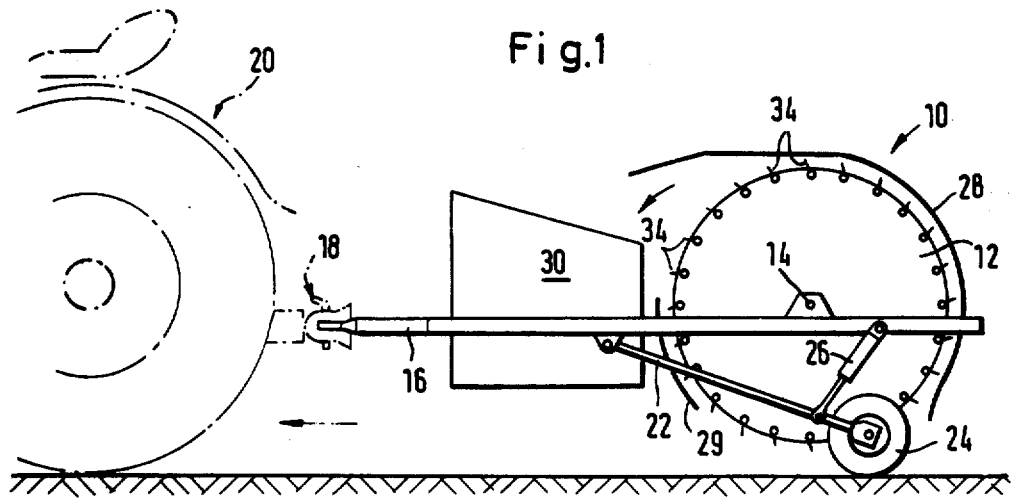

United States Patent [19]

Orth

[11] 4,148,362

[45] Apr. 10, 1979

[54] PENETRATING MACHINE

[75] Inventor: Günther Orth, Birken, Fed. Rep. of Germany

[73] Assignee: Wolf-Gerate GmbH, Fed. Rep. of Germany

[21] Appl. No.: 849,473

[22] Filed: Nov. 7, 1977

[30] Foreign Application Priority Data

Nov. 5, 1976 [DE] Fed. Rep. of Germany ....... 2650772
Aug. 1, 1977 [DE] Fed. Rep. of Germany ....... 2734676

[51] Int. Cl.² .......................................... A01B 45/02
[52] U.S. Cl. ...................................... 172/22; 111/89; 172/112
[58] Field of Search ................. 172/22, 21, 112, 113, 172/240; 111/89, 91

[56] References Cited

U.S. PATENT DOCUMENTS

| | | | |
|---|---|---|---|
| 1,914,915 | 6/1933 | Handler | 111/89 X |
| 2,127,510 | 8/1938 | Fulton | 111/89 |
| 2,700,926 | 2/1955 | Goit | 172/22 |
| 2,750,860 | 6/1956 | Zanola | 172/240 X |
| 3,084,493 | 4/1963 | Kucera | 172/112 X |
| 3,224,512 | 12/1965 | Alexander | 172/22 X |
| 3,429,378 | 2/1969 | Mascaro | 172/22 |
| 3,590,928 | 7/1971 | Mirus | 172/240 |
| 3,739,857 | 6/1973 | Little | 172/22 |
| 3,834,464 | 9/1974 | Carlson et al. | 172/22 |
| 3,881,553 | 5/1975 | Angeski | 172/22 |

Primary Examiner—Paul E. Shapiro
Attorney, Agent, or Firm—Ostrolenk, Faber, Gerb & Soffen

[57] ABSTRACT

A lawn perforating machine for forming rows of holes in the ground comprises a perforating roller which is adapted to roll on the ground and whose peripheral surface carries perforating tubes mounted for pivotal movement about axes extending parallel to the axis of the roller so that from the beginning to the end of their contact with the ground their axes remain substantially perpendicular to the ground. Part of the periphery of the roller is enclosed by a guide plate to intercept plugs of earth formed by the perforating tubes. In one embodiment a spring comb is disposed behind the roller to produce clean holes even in wet ground.

18 Claims, 8 Drawing Figures

PENETRATING MACHINE

This invention relates to perforating machines, for example, machines for treating grass areas by punching rows of holes in the ground.

It is frequently desirable to have available rows of holes in the ground which remain free to the depth punched out and also which do not have broken edges over which the earth can spill and fill the hole again. Rows of holes of this kind are, for example, required when sowing grass areas which are required to grow rapidly into a usable playing field. After sowing a protected plant then grows in each hole, and a grass area can be rapidly produced or renewed. For this purpose existing grass areas of varying sward density must be uniformly perforated in such a manner that holes of a depth of from 30 to 80 mm and a diameter of from 10 to 20 mm are punched out of the grass bearing layer at intervals of from 20 to 50 mm, and the punched-out plugs of earth are then either crushed or collected in a collector. The holes punched out serve on the one hand to aerate the grass bearing layer, and on the other hand for the sowing of suitable grasses whose seeds can then develop in a particularly advantageous manner in the holes, protected to a large extent against dryness and mechanical damage.

In order to produce rows of holes of this kind, perforating rollers are used which are adapted to roll on the ground and whose surface carries perforating tubes mounting for pivoting movement parallel to the axis of the roller in such a manner that from the beginning to the end of their contact with the ground the axes of all the perforating tubes remain substantially perpendicular to the ground.

In each punching operation the earth penetrating into the perforating tube pushes in front of it the earth previously punched out, and this material passes out at the rear end of the perforating tubes, that is to say to the interior of the roller. Finely comminuted material will pass out through the surface of the roller and back to the ground, which is, in no way, detrimental because this earth has been loosened and may even penetrate into the plant holes without any hamrful action.

Larger, uncrushed parts of the plugs of earth were hitherto also thrown out and spread over the surface of the ground, but this has been found to be disadvantageous.

The present invention seeks to provide a perforating machine where the earth can be collected.

According to one particular aspect of the present invention there is provided a perforating machine for forming rows of holes in the ground comprising: a perforating roller which is adapted to roll on the ground and whose peripheral surface carries perforating tubes mounting for pivotal movement about axes extending parallel to the axis of the roller in such a manner that from the beginning to the end of their contact with the ground their axes remain substantially perpendicular to the ground, at least a part of the periphery of the roller being enclosed by guide means for intercepting plugs of earth formed by the perforating tubes.

For example, plugs of lawn earth pressed through the perforating tubes into the interior of the roller are carried out of the roller again, through the free spaces existing between the perforating tubes by means of plates disposed in the interior of the roller, and by way of the guide means so that they are collected in a container disposed in front of the roller. For the purpose which the perforating machine is intended to achieve this arrangement is of fundamental importance because the removal of the plug of earth means that the ground being treated can always be kept clean. Sowing is therefore considerably more rational.

The present invention may produce clean rows of holes having relatively sharp edges punched out of the ground as the roller rolls continuously over the latter. The plugs of earth punched out pass through the hollow perforating tubes into the interior of the roller, from where they can be passed to a collecting vessel provided on the machine.

It has however been found that under certain ground conditions, particularly with wet ground, there is a danger that plugs of earth will adhere to the surface of the roller between the perforating tubes or to the perforating tube carriers or will be pulled out of the ground by the perforating tubes, so that the perforation pattern may be destroyed and an irregular ground surface produced, and thus the sowing of the seeds in the rows of holes will also be made difficult.

The present invention therefore seeks to provide a perforating machine for producing clean rows of holes even with ground of an unfavourable nature and preventing the tearing out of lumps of earth or turf between the holes.

The perforating machine may, therefore, include a spring comb whose teeth extend rearwards under the perforating roller and lie between the perforating tubes. Through the provision of this spring comb, during the rolling of the roller, the hollow perforating tubes preferably run into the gaps between the teeth and after the rolling operation will be lifted out of the spring comb again. The perforating machine preferably includes spring means for urging said teeth into contact with the ground, said spring means being adjustable.

In addition, the spring comb aims to balance the roller when minor irregularities of the ground occur, since the teeth, which are suspended individually or preferably in pairs, can adapt themselves to smaller bumps in the ground, in contrast to the roller itself.

Finally, the spring comb serves the function of an intercepting net under the roller, since the teeth extending longitudinally in the direction of travel and carriers for the teeth extending transversely of the direction of travel, form a net and prevent plugs of earth and turf from falling onto the ground, so that these plugs of earth and turf can be carried into the collecting vessel.

In one embodiment, the perforating machine includes a plurality of hose means through which seeds and/or fertilizer are discharged from a container between the teeth at a position behind the perforating roller in the direction of travel.

Figure 2:
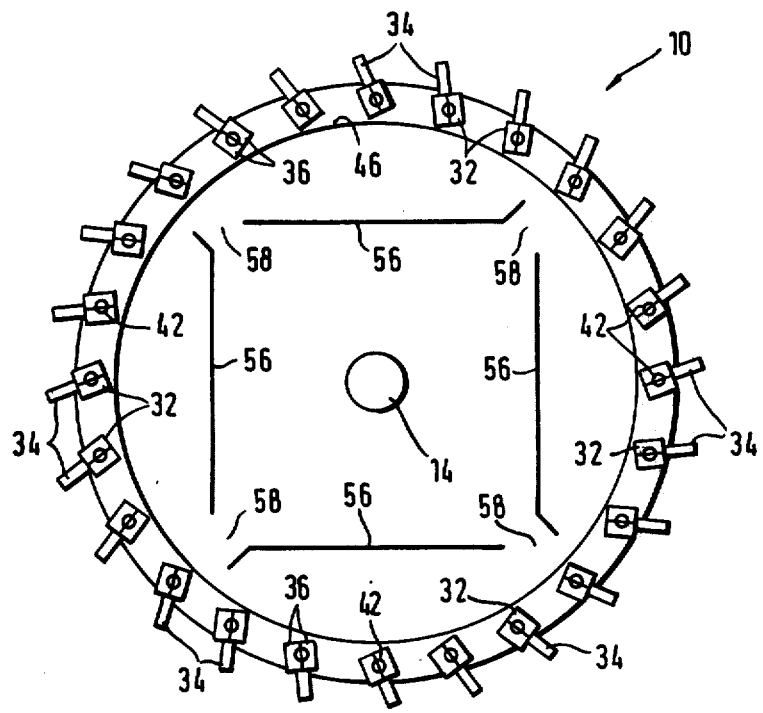
Figure 3:
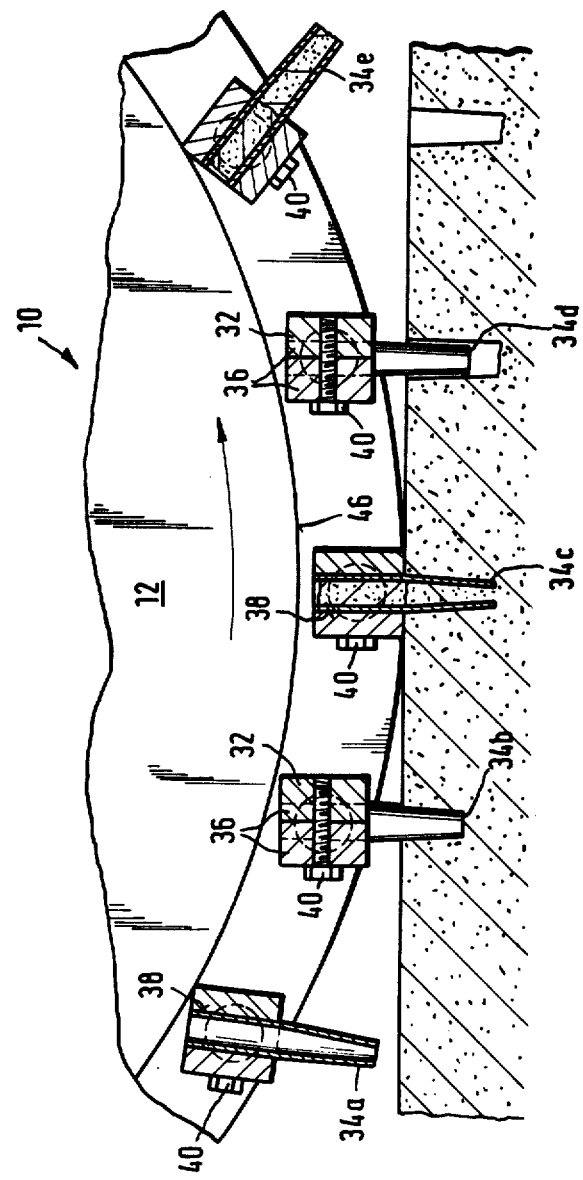
Figure 4:
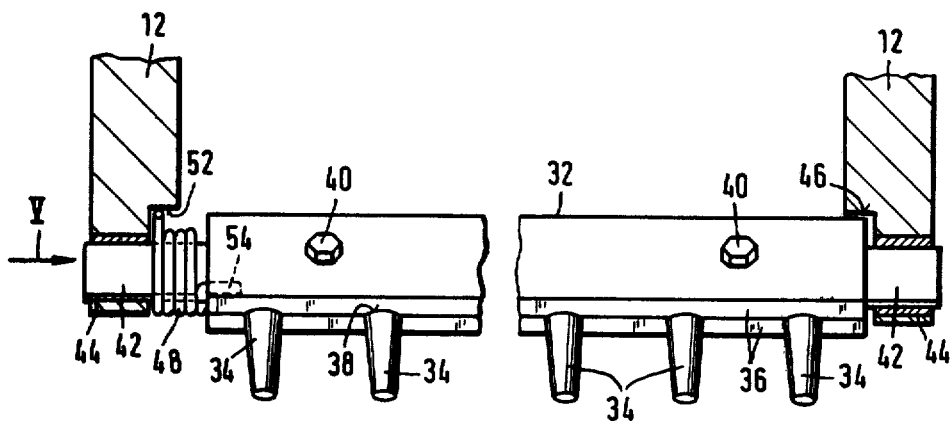
Figure 5:
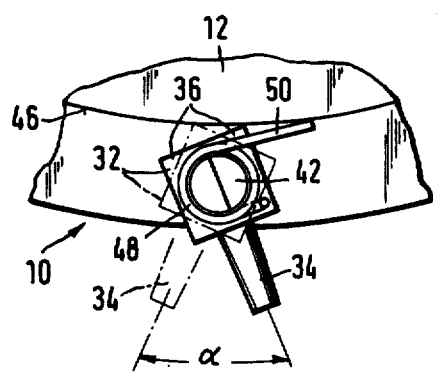
Figure 6:
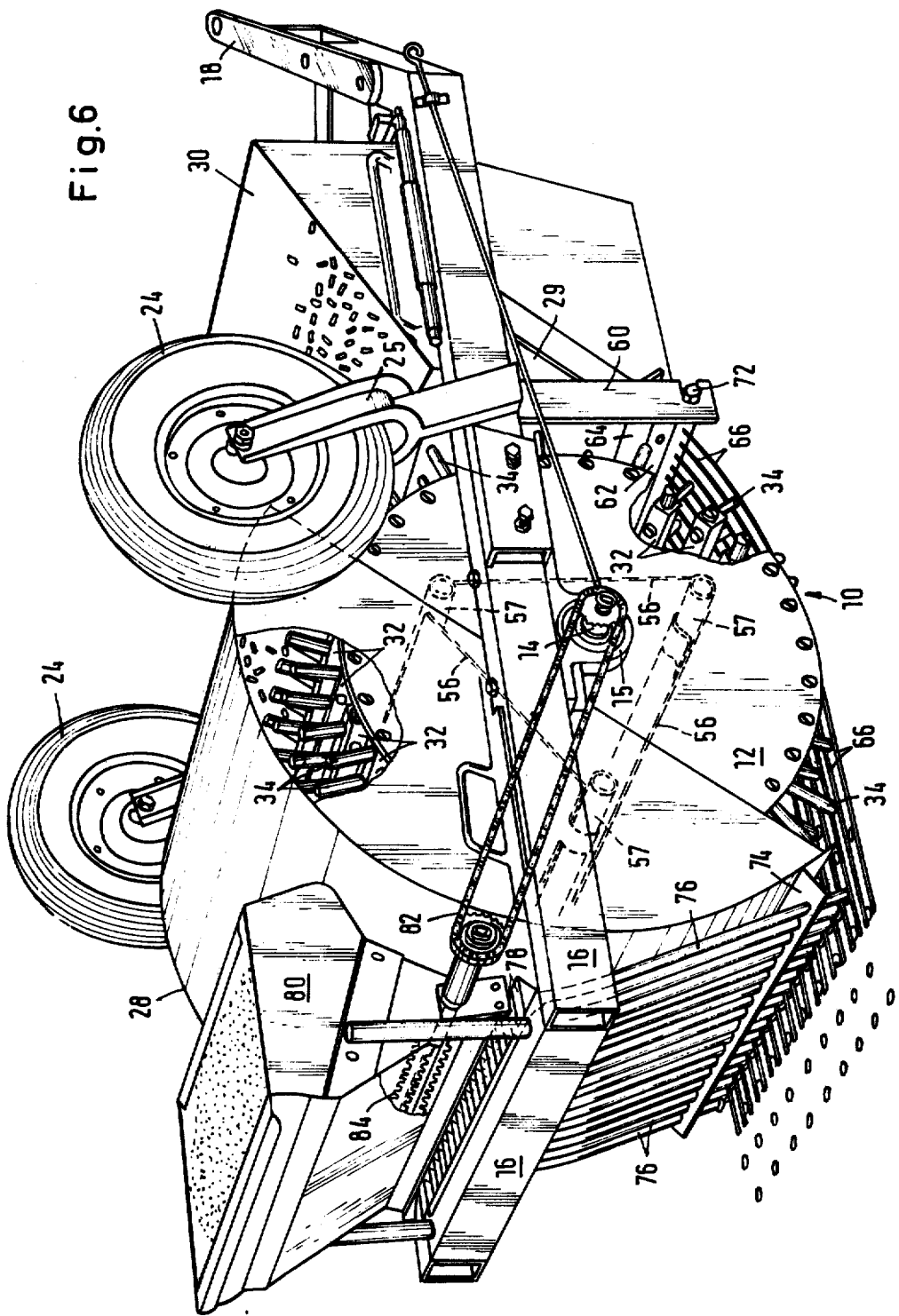
Figure 7:
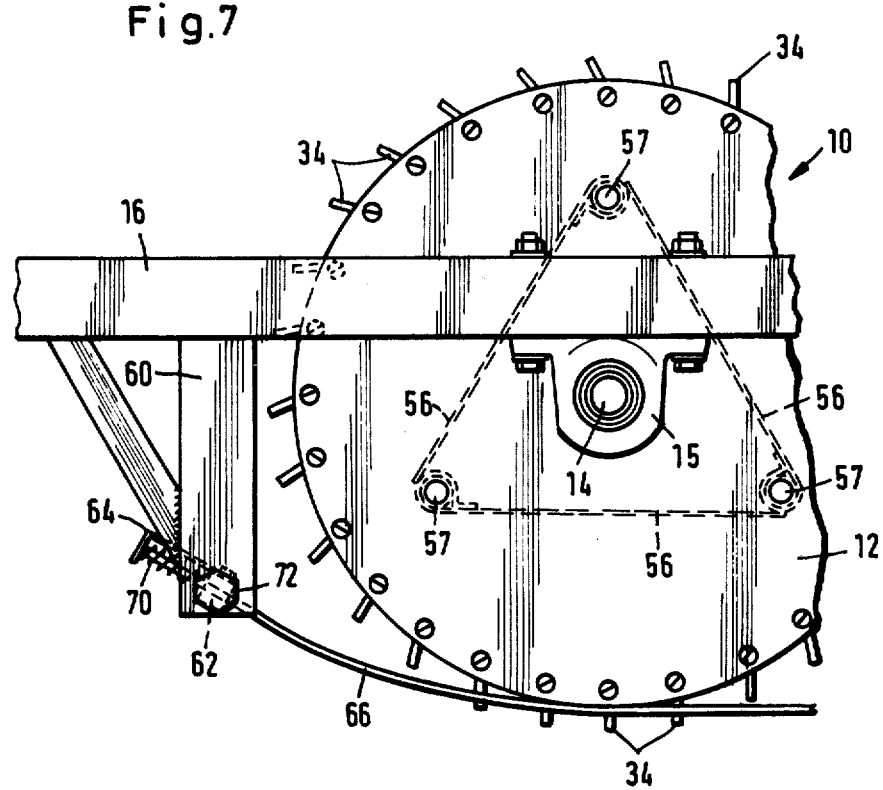
Figure 8:
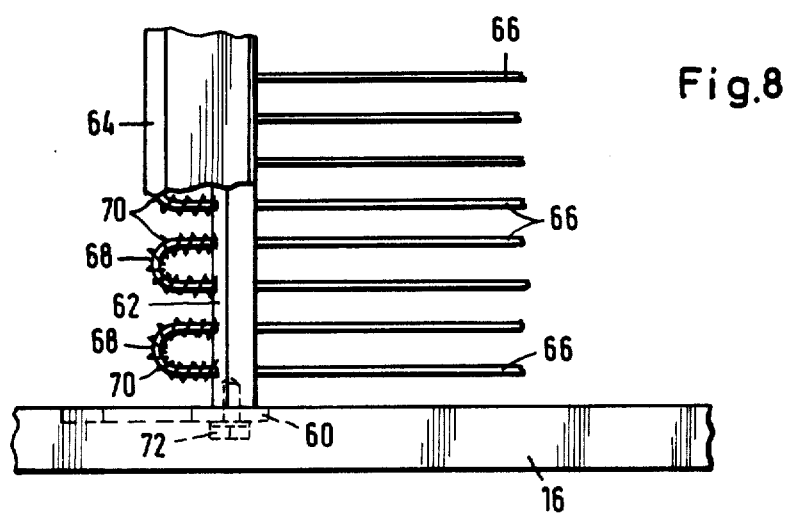

The invention is illustrated, merely by way of example, in the accompanying drawings, in which:

FIG. 1 is a diagrammatic elevation of one embodiment of a perforating machine according to the present invention towed by a tractor, FIG. 2 shows, on an enlarged scale, a radial section of a perforating roller of the machine of FIG. 1, FIG. 3 is a partial elevation of the roller of FIG. 2 running on the ground, FIG. 4 is an elevation of a perforating tube carrier of the machine of FIG. 1, FIG. 5 is a view in the direction of arrow V of FIG. 4, FIG. 6 is a perspective view of a second embodiment of a perforating machine according to the present invention, FIG. 7 is a partial side view showing a spring comb of the machine of FIG. 6, and FIG. 8 is a plan view, partially broken-away, of the mounting of the spring comb of FIG. 7.

A perforating machine according to the present invention and shown in FIGS. 1 to 5 has a roller 10 with two end face discs 12 through which is guided an axle 14, which, by means of bearings, carries the two ends of a frame or fork arm 16 which is adapted to be connected by means of a coupling 18 to a tractor 20. Two bars 22 are pivotally articulated to the fork arm 16 only one of them being visible in FIG. 1. At their ends the bars 22 carry wheels 24 which can be extended by means of pneumatic or hydraulic piston drives 26 into the travelling position shown in FIG. 1, in which the roller 10 is lifted off the ground for the purpose of transport. A protective plate 28 is disposed around the front end upper surface of the roller to guide particles of earth, which pass radially outwardly to the interior of a container 30 fastened on the fork arm 16 in front of the roller 10. A further protective plate 29 is mounted in the region of the container 30.

The peripheral surface of the roller is formed by a plurality of square-section bars 32 which are carried by the discs 12 and which, in turn, support perforating tubes 34. A plurality of perforating tube carriers each consists of two half-bars 36 which are provided with part-cylindrical recesses 38 spaced apart from one another, the perforating tubes 34 being inserted into these recesses and clamped therein. Clamping is effected by means of threaded bolts 40 which clamp the two half-bars 36 together. Each bar 32 is provided at its ends with a stub axle 42 which is mounted by means of a bearing bush 44 for limited pivotal movement in holes in the discs 12. The perforating tube carriers are pivotal through an angle α equal to substantially 45°, this angle being limited by the abutment of the respective bar 32 with a recess 46 in the discs 12. As can be seen in FIG. 5, the perforating tubes 34 thus can be pivoted through an angle α/2, together, out of a central position in which they project radially of the roller. All the perforating tube carriers are biased in the direction of travel of the roller by means of coil springs 48, so that the perforating tubes 34 penetrate into the ground with their axes substantially perpendicular to the latter. A tangentially projecting end of each spring 48 supports against the recess 52 in the disc 12, and the other end 54, which is bent over axially, is anchored in a hole in the respective bar 32.

As can be seen in FIG. 3, the angular adjustment is such that in a position 34a shortly before contact is made with the ground, the axis of the perforating tube extends almost perpendicularly to the ground. As the perforating tube penetrates further, in positions 34b and 34c, the perforating tube is pressed into the ground in this vertical position, the perforating tube carriers being pivoted. In the position 34c the perforating tube has penetrated fully into the ground and has stamped out a plug of earth. In position 34d the perforating tube was already withdrawn slightly from the ground, but is still in the vertical position. Only in position 34e is the perforating tube returned to the position shown in FIG. 5 by the spring 48, after it has been freed from the earth. As the roller continues to rotate, the plug of earth stamped out by the perforating tubes, which passes out through a rear open end of the latter, drops into the interior of the roller, where it impinges on guide plates 56, on which the earth is comminuted and delivered outwards into the container 30, unless it falls directly onto the ground between the perforating tube carriers.

The distance between the bars 32 is selected so that the plugs of earth penetrating into the interior of the roller through the perforating tubes 34 are thrown out of the interior of the roller again through gaps 58 between the individual bars. The extent of the movement of the bars 32, that is to say the angle α, should be determined in dependence upon the diameter of the roller in such a manner that the vertical penetration into the ground and the extraction of the plugs of earth from the ground is achieved, as illustrated in FIG. 3. The springs 48 are chosen so that the respective bars 32 can turn relatively easily, so that the holes formed in the ground will not break up prematurely. The finely comminuted particles of earth and plants fall through the bars 32 while particles of earth and plants which have not been comminuted pass, by way of the guide plates 28, 56 into the container 30, which may be emptied by tipping sideways. The perforating tubes are preferably staggered in relation to one another in the peripheral direction.

The plugs of earth are punched out of a grass bearing layer in one operation or in a number of overlapping operations, these plugs of earth passing through the perforating tubes into the interior of the roller, where they are comminuted mainly through the rotary movement of the roller in conjunction with the guide plates 56, whereupon the comminuted plugs of earth can pass through slots 58 and out of the peripheral wall of the roller. Owing to the fact that the bars 32 carrying the perforating tubes are continuously kept in an oscillating movement, the clogging of the peripheral surface of the roller is prevented both from inside and from outside. During the rotation of the roller the plugs of earth comminuted in the interior of the roller pass out through the slots in the peripheral surface of the roller, and particles of earth between the guide plate 28 and the peripheral surface of the roller are carried by the perforating tubes, which here have the function as transport means, to the container 30. The guide plates 56 in the interior of the roller may be pivotable and turn in such a manner that a polygonal closed body is formed in the interior of the roller.

Another embodiment of a perforating machine according to the present invention is illustrated in FIGS. 6 to 8. Like parts in the embodiment of FIGS. 1 to 5 and in the embodiment of FIGS. 6 to 8 are being designated by the same reference numerals and will not be described further. The running wheels 24 are carried by fork arms 25 and can be moved out of the position shown in FIG. 1 into a running position in which they run on the ground in order to keep the perforating roller 10 at a distance from the latter. The fork arms 25 may instead be rigidly joined to the fork arm 16 and, in this case, the arrangement is turned over for transport purposes, so the perforating roller comes to lie at the top.

In front of the roller 10, referring to the direction of travel, the fork arm 16 is provided on each side with a downwardly projecting carrier 60 and a spring comb is disposed between these carriers 60. The spring comb comprises a square-section member 62 to which is connected a forwardly extending L-section member 64. The member 62 is provided with through-holes through which are guided a plurality of teeth or spring bars 66 which extend rearwards under the roller 10, in such a manner that each of them comes to lie between two perforating tubes 34. In the embodiment illustrated, each pair of spring bars 66 is made in one piece and is U-shaped and connecting portion 68 projects towards the respective member 62, inside the L-section member. The portion projecting from the member 62 carries a coil spring 70, which is supported against the member 62 and prestresses the bars in an outward direction, the connecting portion 68 being supported against the front arm of the respective members 64 shown in FIG. 7. In this way the individual pairs of spring bars 66 are secured in such a manner as to be readily replaceable. All that is required is to lift out the end connecting portion 68 under the respective member 64, so that they can simply be pulled out and replaced by new pairs of spring bars. The spring 70 gives the spring bars elasticity in the longitudinal direction.

The spring bias by which the spring bars 66 rest on the ground can be varied by adjusting the angle at which the members 62, 64 are fastened on the carriers 60. Fastening in the desired angular position is effected by means of a clamp bolt 72 engaging in a threaded hole in the member 62.

The guide plates 56 are provided on carrier tubes 57 inside the roller. As can be seen in FIG. 6, the perforating tubes 34 following one another in the peripheral direction are staggered in relation to one another, and the spring bars 66 extend in the immediate proximity of the respective perforating tubes penetrating into and lifted out of the ground, so that the ground immediately adjoining the edge of the respective hole is gripped and held down.

On the protective plate 28 there is fastened, near the ground, a perforated plate 74 which is provided with a row of holes through which pass the ends of transparent hoses 76, whose mouths are situated directly above the ground, between each two spring bars 66. At the top, these hoses are fastened to the fork arm 16, where they have funnel openings 78 into which leads an outlet slot of a vessel 80 provided with a metering roller 84 which is driven, via a chain drive 82, by the wheel axle 14 and which feeds material which is to be scattered, for example grass seeds or grass fertilisers, through the outlet slot to the funnel mouths 78, so that this material is carried directly between the spring bias into the holes punched out into the ground. In this manner perforation and sowing can be effected in one operation. The depth of the punched hole can be adjusted from about 2 cm to 8 cm. It is possible to achieve intensive perforation of up to 600 holes per square meter, while none of the holes punched will become clogged, because the spring bars 66 act directly on the edges of the holes being formed.

What is claimed is:

1. A perforating machine for forming rows of holes in the ground comprising: a perforating roller which is adapted to roll on the ground and whose peripheral surface carries perforating tubes mounting for pivotal movement about axes extending parallel to the axis of the roller in such a manner that from the beginning to the end of their contact with the ground their axes remain substantially perpendicular to the ground, at least a part of the periphery of the roller being enclosed by guide means for intercepting plugs of earth formed by the perforating tubes.

2. A machine as claimed in claim 1 including a collecting vessel mounted for lateral tipping on a frame joined to the body of the roller and disposed in front of the roller in the direction of travel of the latter.

3. A machine as claimed in claim 1 including guide plates forming a polygonal body disposed in the interior of the roller.

4. A machine as claimed in claim 3 in which outlet slots are provided between the guide plates.

5. A machine as claimed in claim 3 in which the guide plates are pivotally mounted.

6. A machine as claimed in claim 1 including perforating tube carriers for carrying the perforating tubes, each perforating tube carrier being in the form of a square-section bar mounted in a reset, an abutment being provided to limit pivotal movement of said bars.

7. A machine as claimed in claim 1 including transport wheels which can be moved to a transport position by a power drive.

8. A machine as claimed in claim 1 in which the perforating tubes of two adjacent rows of perforating tubes are staggered relative to one another.

9. A machine as claimed in claim 1 including a spring comb whose teeth extend rearwards under the perforating roller and lie between the perforating tubes.

10. A machine as claimed in claim 9 including spring means for urging said teeth into contact with the ground, said spring means being adjustable.

11. A machine as claimed in claim 9 in which the teeth are sprung individually or in pairs in the longitudinal direction.

12. A machine as claimed in claim 9 in which the teeth are inserted into holes extending parallel to one another in a square section carrier which is secured, for axial adjustment, on two lateral carrier arms, coil compression spring means being disposed between the square-section member and a projecting end of the teeth.

13. A machine as claimed in claim 12 in which an L-section member, which forms an abutment for the projecting ends of the teeth, is attached to the square-section member.

14. A machine as claimed in claim 12 in which the square-section member is fastened on the carrier arms by means of damping means so as to be angularly adjustable.

15. A machine as claimed in claim 12 in which the teeth are formed in a U-shape as pairs of teeth.

16. A machine as claimed in claim 9 including a plurality of hose means through which seeds and/or fertiliser are discharged from a container between the teeth at a position behind the perforating roller in the direction of travel.

17. A machine as claimed in claim 16 in which an inlet end of each hose means is provided with a feed funnel above which is disposed an outlet slot of a spreading device provided with a metering roller.

18. A machine as claimed in claim 16 in which the hose means are transparent.

* * * * *